US007414962B2

(12) United States Patent
Izumi (10) Patent No.: US 7,414,962 B2
(45) Date of Patent: Aug. 19, 2008

(54) OFDM DIVERSITY TRANSMISSION (75) Inventor: Seiichi Izumi, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 736 days.

(21) Appl. No.: 09/836,630

(22) Filed: Apr. 17, 2001

(65) Prior Publication Data

US 2001/0033547 A1    Oct. 25, 2001

(30) Foreign Application Priority Data

Apr. 18, 2000    (EP) ................................. 00108459

(51) Int. Cl.
*H04J 11/00* (2006.01)
*H04J 3/06* (2006.01)
(52) U.S. Cl. ...................... 370/206; 370/516; 375/226; 375/299
(58) Field of Classification Search ................ 370/203, 370/208, 328, 343, 480, 210, 206; 375/349, 375/260, 267, 299, 347, 219, 262, 275, 296; 455/101, 132
See application file for complete search history.

(56) References Cited

U.S. PATENT DOCUMENTS

| 5,561,673 | A | * | 10/1996 | Takai et al. ................ 714/708 |
| 5,867,478 | A | * | 2/1999 | Baum et al. ................ 370/203 |
| 5,970,397 | A | * | 10/1999 | Klank et al. ................ 455/139 |
| 5,973,642 | A |   | 10/1999 | Li et al. |
| 6,070,056 | A | * | 5/2000 | Sakoda et al. ............ 455/67.11 |
| 6,111,919 | A | * | 8/2000 | Yonge, III .................... 375/260 |
| 6,131,016 | A | * | 10/2000 | Greenstein et al. ............ 455/69 |
| 6,134,261 | A | * | 10/2000 | Ryan ........................... 375/141 |
| 6,618,352 | B1 | * | 9/2003 | Shirakata et al. ............ 370/203 |
| 6,700,865 | B1 | * | 3/2004 | Yamamoto et al. .......... 370/208 |
| 6,763,225 | B1 | * | 7/2004 | Farmine et al. .......... 455/67.16 |
| 6,807,145 | B1 | * | 10/2004 | Weerackody et al. ........ 370/203 |
| 2002/0154705 | A1 | * | 10/2002 | Walton et al. ............... 375/267 |

FOREIGN PATENT DOCUMENTS

EP    0 823 804    2/1998
EP    0 881 782    12/1998

OTHER PUBLICATIONS

Takahashi H et al: "Antenna and Multi-Carrier Combined Diversity System" IEICE Transactions on Communications, JP, Institute of Electronics Information and Comm. Eng. Tokyo, vol. E79B, No. 9, Sep. 1, 1996, pp. 1221-1226, XP000636058.

* cited by examiner

*Primary Examiner*—Chi H. Pham
*Assistant Examiner*—Soon D Hyun
(74) *Attorney, Agent, or Firm*—Oblon, Spivak, McClelland, Maier & Neustadt, P.C.

(57) ABSTRACT

In an OFDM transmission a transmission diversity technique is used without orthogonal signaling. The phases of the sub-carriers received at the different antennas are compared by different techniques and then the phases of the signals for different antennas are adjusted for a subsequent transmission over the OFDM interface. The phase (and optionally amplitude) adjustment is calculated in only one (transmitting) side and no orthogonal signaling required. The number of antennas can be increased as much as necessary to get a sharper beam. The negative effects of fading and interference can be reduced so that at same time a down link transmission power can be reduced.

27 Claims, 5 Drawing Sheets

FIG 3 d: delay between antenna 1 and 2.
Phase diff. = 2pi*d/T

FIG 4 path difference

PRIOR ART

OFDM DIVERSITY TRANSMISSION

BACKGROUND

The present invention relates to a transmission diversity device, to a method for a wireless transmission diversity transmission as well as to a computer program for performing such a method.

Figure 8:
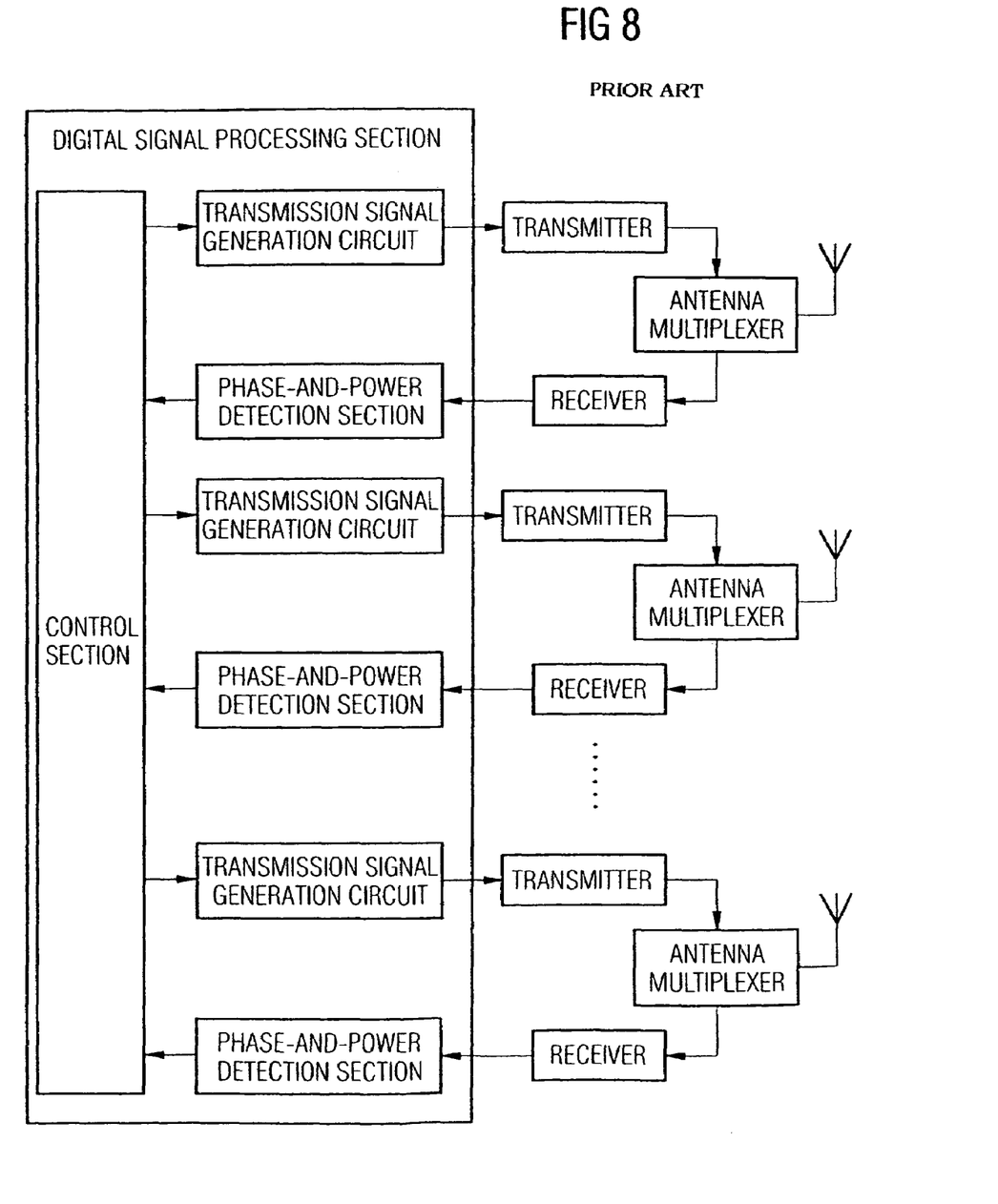
FIG. 8 shows a TX diversity receiver according to the prior art.

From EP-0 881 782 A2 a single carrier maximum ratio synthetic transmission diversity device as shown in FIG. 8 is known. According to this known transmission diversity deice antenna elements are arranged at intervals greater than λ/2. A signal received by an antenna element is sent by way of an antenna multiplexer to a receiver, where the signal is demodulated. The thus-demodulated signal is sent to a phase- and power detection section, where a phase and power of the signal are detected. On the basis of the result of such detection, a control section calculated the phase and power of a transmission signal. On the basis of the result of the calculation, a transmission signal generation circuit transmits a transmission signal to each of the antenna elements by way of the antenna multiplexer.

Note that the technique of EP 0 881 782 A2 claiming the calculation of the phase of a signal of each antenna cannot be applied to the multicarrier case, but only to a single carrier case, as it is impossible to measure phases of received signals if there are more than two carriers.

In single carrier applications the phase of the signal changes frequently as the symbols are transmitted serially. Therefore it is difficult to compare phases between different antennas, as the phase is not varying uniformly. Therefore in singles carrier applications a phase comparison is preferably done using pilot symbols which phases are varying uniformly or which are known.

From U.S. Pat. No. 5,973,642 adaptive antenna arrays for orthongonal frequency division multiplexing systems (OFDM systems) with co-channel interference is known. According to this known technique parameters for adaptive antenna arrays in OFDM systems with co-channel interference are estimated. The channel parameter estimation is performed using a two pass process that advantageously expands the temporal scope and considers past, present and future temporal channel estimations during parameter estimation. Channel parameters are estimated by processing he signal through fast FOURIER transforms, temporal filters and inverse fast Fourier transforms. The temporal filters optimize parameters estimation based upon instantaneous correlation of the received signals. This all takes place on the receiver's side of the OFDM system.

SUMMARY

In view of the above-captioned prior art it is the object of the present invention to provide for a technique enabling the reduction of negative multipath effects by means of a transmission diversity technique, wherein said technique should be applicable to OFDM systems and particularly to transmitters of an OFDM system.

This object is achieved by means of the features of the independent claims. The dependent claims develop further the central idea of the present invention.

According to the present invention therefore a transmission diversity device with a plurality of antenna elements is provided. A plurality of processing devices is provided which are respectively connected to one of the antenna elements. Phase comparison and adjustment means are provided for comparing phases of signals received at one of the antenna elements and for adjusting the phases of signals transmitted by the antenna elements according to the result of the comparison. Insofar this technique is known from EP 0 881 782 A2 representing the closest prior art.

The transmission diversity device according to the present invention is characterized in that the transmission diversity deice is designed for a multicarrier transmission such as an OFDM transmission. The transmission diversity device according to the present invention compares the phases of at least one subcarrier of the multicarrier transmission with the phase of at least one subcarrier of at least one other antenna element and adjusts it subsequently for a transmission. In the OFDM case the symbol duration is much longer than in the single carrier case such that a phase comparison can be done at any symbol and pilot symbols are not necessary therefore.

According to the present invention subcarriers and not the received signal itself are to be phase processed.

The transmission diversity device according to the present invention can comprise a subcarrier phase comparison dependent amplitude adjustment function.

Furthermore, it can comprise a function of averaging the phase differences of a plurality of subcarriers respectively received at one antenna element. Note that in the case of a multicarrier transmission system, each of the antenna elements receives a plurality of signals with different subcarriers.

The transmission diversity device according to the present invention can furthermore comprise the function of frequency adjusting the phase differences of the subcarriers received respectively at one antenna means.

Furthermore, the transmission diversity device according to the present invention can comprise the function of comparing only predetermined selected subcarriers of different antenna means.

According to a further aspect of the present invention a method for a wireless diversity transmission by means of a plurality of antenna elements and plurality of processing devices respectively connected to one of the antenna elements is proposed. Phases of signals received at the antenna elements are compared and adjusted according to the result of the comparison for a subsequent transmission by means of the antenna elements.

According to the present invention the phase of at least one subcarrier of a multicarrier transmission for each antenna element is compared with the phase of at least one subcarrier of at least one other antenna element and adjusted subsequently for transmission.

The step of comparing can be repeated at least twice to calculate an average value of the phase comparison used for the step of adjusting the phases for the subsequent transmission.

The multicarrier transmission can be an OFDM transmission.

Furthermore, the step of amplitude adjustment depending on the subcarrier phase comparison can be provided.

The phase differences of a plurality of subcarriers respectively received at one antenna element can be averaged.

The phase differences of the subcarriers received respectively at one antenna element can be frequency adjusted before being compared.

The comparison can be performed with only selected predetermined subcarriers of different antenna elements.

The step of comparing can comprise the step of correlating time domain data.

In case it is detected that any of the antenna elements no signal or a signal with an amplitude below a predetermined threshold is received, said antenna element is not used for a subsequent transmission.

The method can be applied in the base station of a wireless transmission system.

According to a still further aspect of the present invention a computer program for performing, when loaded in a memory of a transmission diversity device, such a method is proposed.

Further advantages, features and objects of the present invention will become evident for the man skilled in the art when reading the following detailed description of embodiments of the present invention to be taken with reference to the figures of the enclosed drawings.

DETAILED DESCRIPTION

Figure 1:
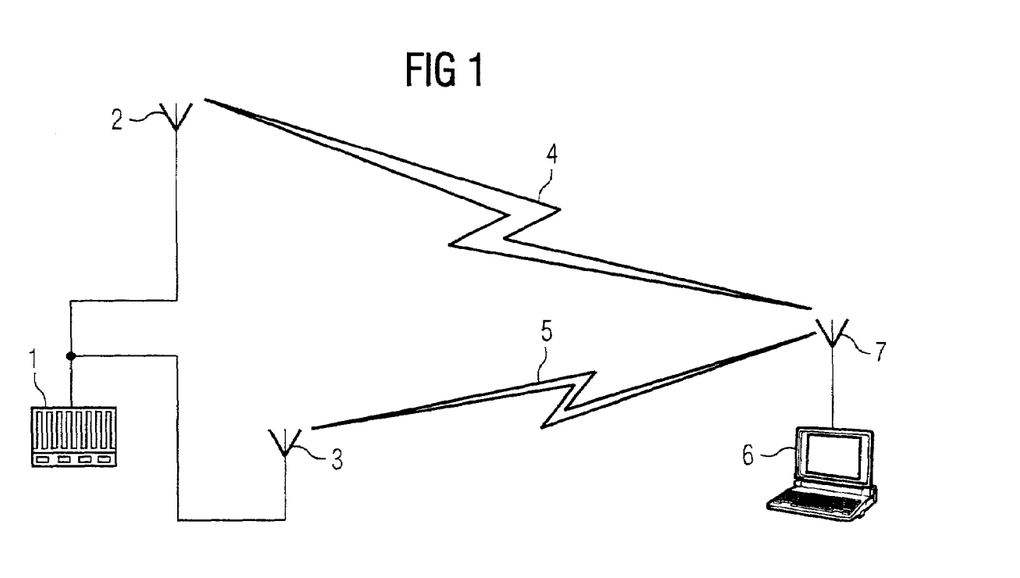
FIG. 1 shows schematically a TX diversity system.
Figure 2:
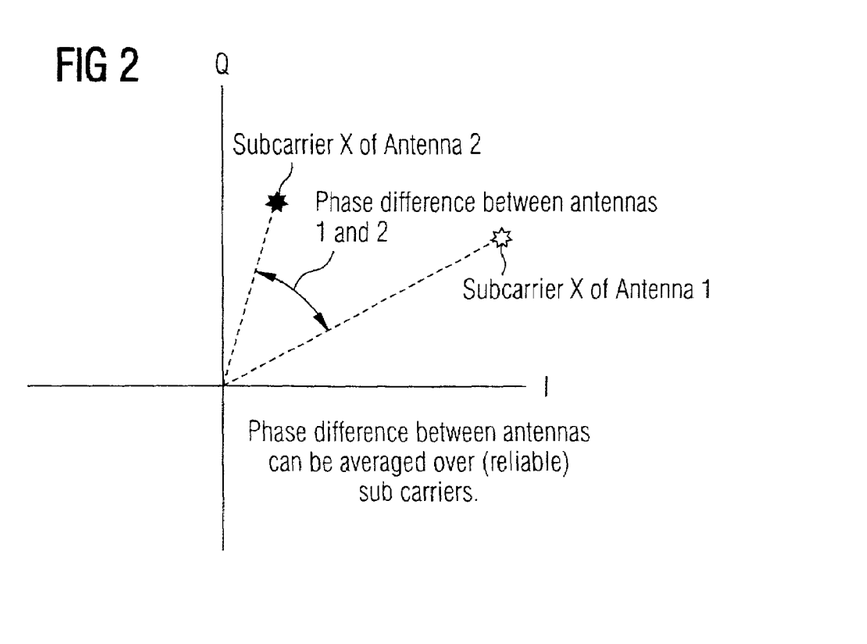
FIG. 2 shows a representation of phase differences of subcarriers originating from different antennas.

FIG. 1 shows a transmission diversity transmission system with a transmitter 1 having a plurality of antenna elements 2, 3. Each of the antenna elements 2, 3 is transmitting by means of a multicarrier transmission technique 4, 5 to a receiver 6 having an antenna 7. As it is well known, the receiver 6 will receive the different signals 4, 5 originating from the distance antenna elements 2, 3 of the transmitter 1 with a phase difference as shown in FIG. 2. Particularly, as the invention is related to multicarrier transmission systems, the corresponding subcarriers of the multicarrier transmission system will be phase shifted as shown in FIG. 2.

Figure 3:
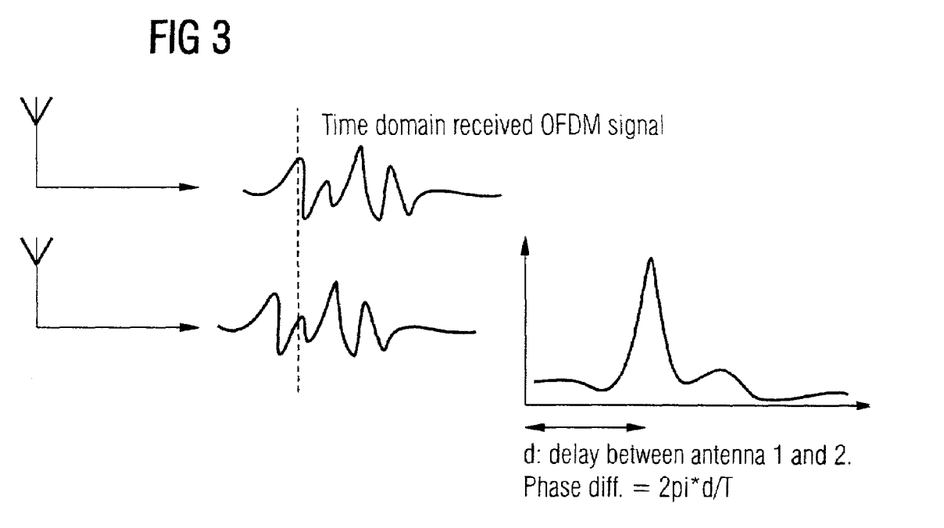
FIG. 3 shows a time domain representation of an OFDM signal received at different antennas.

FIG. 3 shows the corresponding representation for the time domain OFDM signal.

Figure 4:
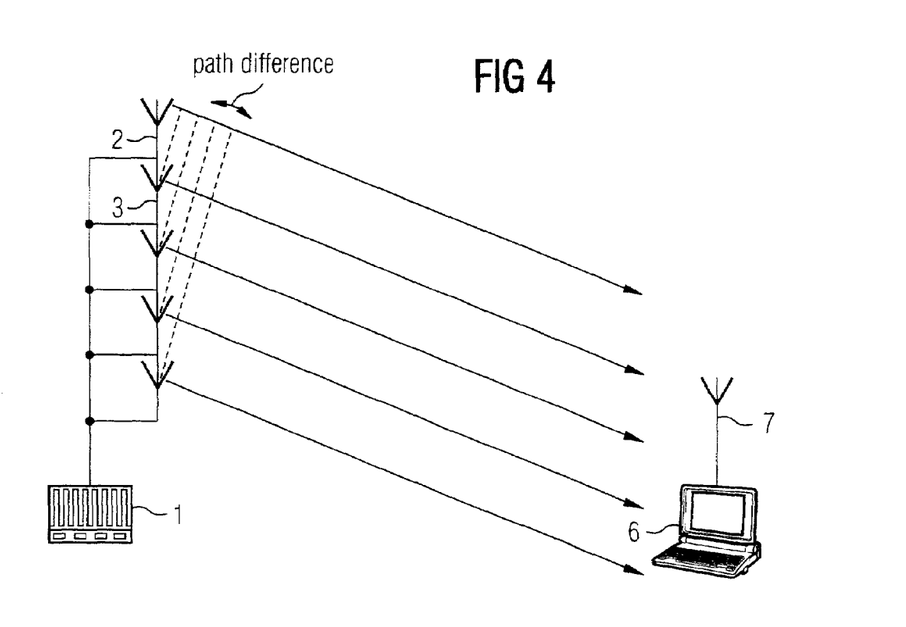
FIG. 4 shows a symmetrical representation of the path difference between respectively one of a plurality of antenna elements of a transmitter and the receiver.

As it is shown schematically in FIG. 4, when transmitting, the different subcarriers should be adjusted such that they arrive at the antenna 7 of the receiver 6 without any relative phase shift.

The TX diversity technique is used to avoid the problem of fading for example due to multipath effects. According to the present invention, as it will be explained with reference to FIG. 5, a phase and/or amplitude adjustment is calculated in transmitter side such that no orthogonal signaling is required. The number of antenna means 2, 3 can be increased as much as possible on the transmitter side to get a sharper beam (beam shaping).

Figure 5:
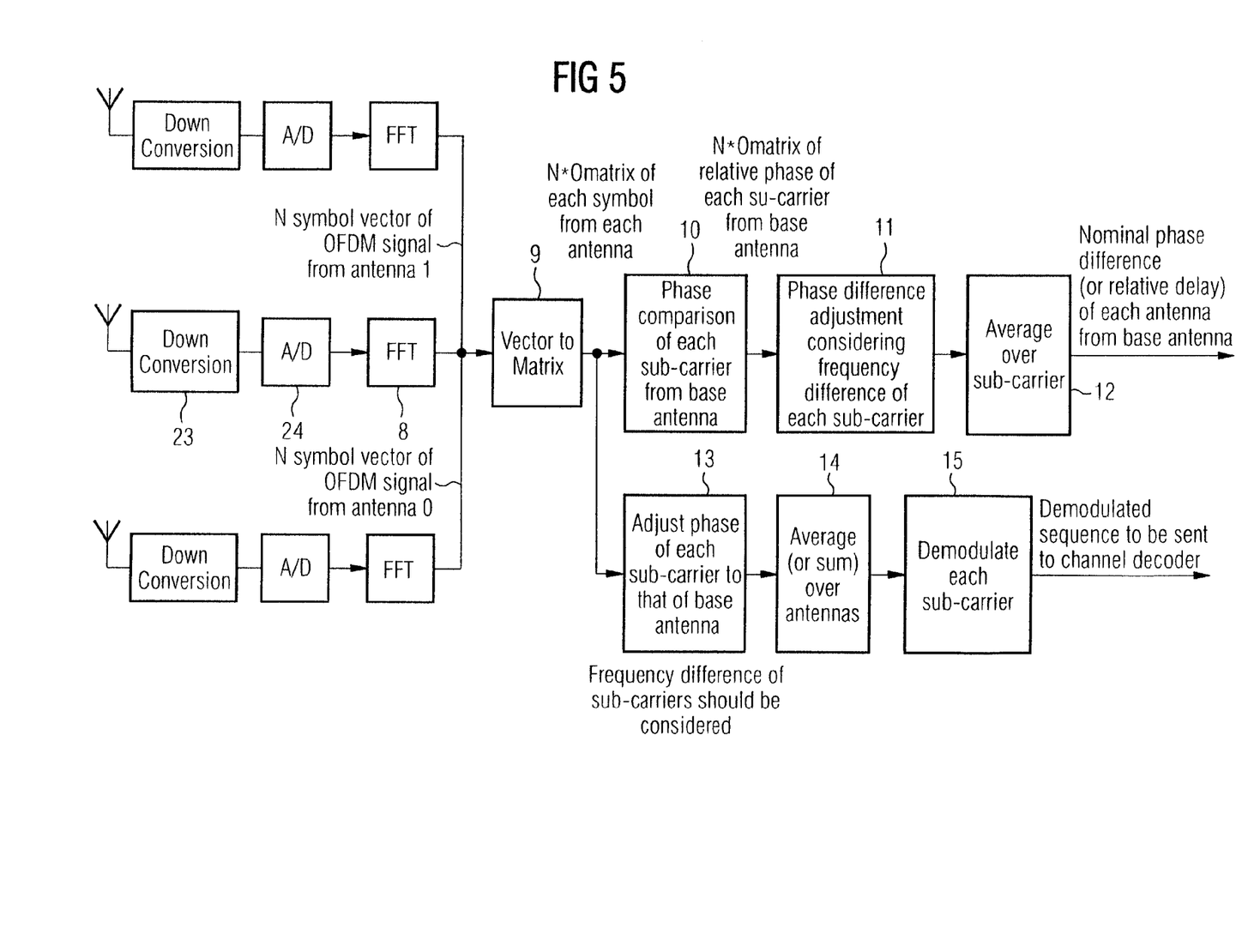
FIG. 5 shows the details of the subcarrier processing in a transmitter according to the present invention.

As shown in FIG. 5, the signals received at the different antenna means 2, 3 are respectively down converted 23 and then A/D converted 24. After effecting a Fourier transform 8 the N symbol vectors of the OFDM signals from the different antennas are combined to a matrix 9.

On the one hand this matrix comprising each symbol from each antenna is passed to a phase comparison unit 10 for a phase comparison of each subcarrier from the antenna means 2, 3. Therefore, a matrix of relative phases of each subcarrier in comparison to the base antenna is generated and supplied to a phase difference adjustment unit 11. The base antenna is selected to express the phase difference between another antenna and said base antenna.

The phase difference adjustment unit 11 adjusts the phases of the subcarriers to compensate for the frequency difference of each subcarrier. Finally, the subcarrier phase differences are averaged 12, such that the nominal phase difference (or relative delay) of each antenna in comparison to one selected base antenna is generated. This nominal phase difference (or relative delay) of each antenna with respect to one selected base antenna is then used for a subsequent transmission, as will be explained with reference to FIG. 6 and 7.

The matrix generated in the unit 9 is furthermore phase adjusted in a unit 13 to compensate for the frequency difference of the subcarriers. The unit 13 is phase adjusting to compensate for the delay difference between the antenna means 2, 3. The unit 13 therefore aligns the phase of each antenna to that of the base antenna, keeping the relative phase between the subcarriers within one OFDM signal from one antenna. This corresponds to a receiver diversity in the base station. If the delay difference between antennas is large, the frequency difference between the subcarriers has to be considered when phase compensating. If the delay difference is not so important, the phase of the subcarriers of each antenna can be uniformly compensated.

In a calculation unit 14 the phases are averaged (or summed up) over the different antennas and then each subcarrier, i.e. the averaged sum up result is demodulated in a demodulating unit 15. The demodulated sequence is then sent to a channel decoder (not shown).

The following mathematical representation shows the vectors and the matrixes for the processing according to FIG. 5:

$$\begin{pmatrix} s_1 \\ s_2 \\ \vdots \\ s_N \end{pmatrix}, \begin{pmatrix} s_{1,1} & s_{1,2} & \cdots & s_{1,Q} \\ s_{2,1} & s_{2,2} & \cdots & s_{2,Q} \\ \vdots & \vdots & \ddots & \vdots \\ s_{N,1} & s_{N,2} & \cdots & s_{N,Q} \end{pmatrix}, \begin{pmatrix} p_{1,1} & p_{1,2} & \cdots & 0 \\ p_{2,1} & p_{2,2} & \cdots & 0 \\ \vdots & \vdots & \ddots & \vdots \\ p_{N,1} & p_{N,2} & \cdots & 0 \end{pmatrix},$$

$$\begin{pmatrix} p'_{1,1} & p'_{1,2} & \cdots & 0 \\ p'_{2,1} & p'_{2,2} & \cdots & 0 \\ \vdots & \vdots & \ddots & \vdots \\ p'_{N,1} & p'_{N,2} & \cdots & 0 \end{pmatrix}, [p'_1 \quad p'_2 \quad \cdots \quad 0], [d_1 \quad d_2 \quad \cdots \quad 0]$$

$S_N$: constellation vector of each subcarrier $S_{sub\text{-}carrier,antenna}$: constellation of each subcarrier and antenna $P_{sub\text{-}carrier,antenna}$: relative phase difference at each subcarrier from base antenna $P'_{sub\text{-}carrier,antenna}$: adjusted phase difference to nominal frequency (center frequency)

Figure 6:
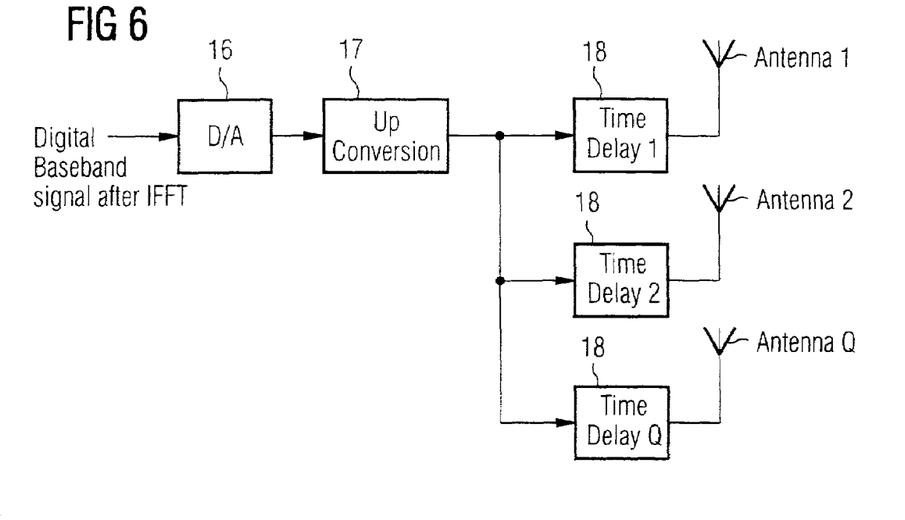
FIG. 6 shows a first alternative for adjusting a transmission.

$P'_{antenna}$: averaged phase difference from base antenna at nominal frequency $d_{antenna}$: delay of each antenna from base antenna FIG. 6 shows a transmission following the phase comparison process as shown in FIG. 5.

The digital baseband signal after the IFFT processing is D/A converted 16, then passed through an converter 17 and finally supplied to the different antennas by means of a time delay unit 18. The time delay units 18 apply a time delay corresponding to the nominal phase differences output from the average unit 12 (see FIG. 5). According to the alternative of FIG. 6 therefore a time delay is applied to the up converted signal.

Figure 7:
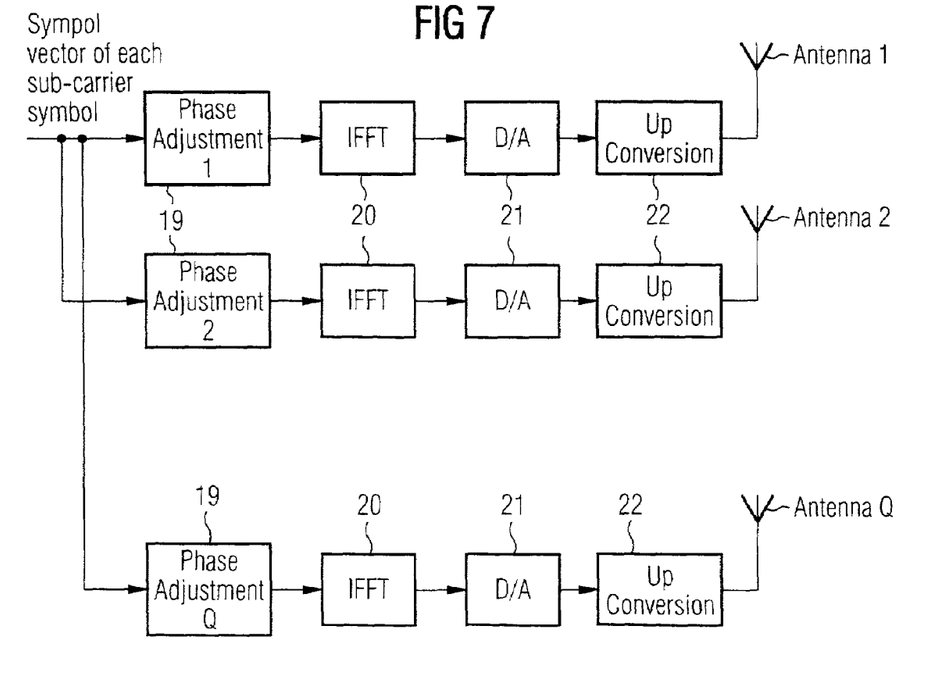
FIG. 7 shows a second alternative for phase adjusting a subcarrier.

According to the alternative of FIG. 7 the symbol vector of each subcarrier symbol is respectively phase adjusted by means of a phase adjusting unit 19 corresponding to the output of the average unit 12 (see FIG. 5). Each phase adjusted symbol vector of each subcarrier symbol is then passed through a IFFT unit 20, a D/A converter 21, an up converter 22 and finally supplied to the corresponding one of the plurality of antenna elements.

The processing according to the present invention can therefore be described as follows:

At the base side a relative phase comparison of each antenna element is performed using the up ling signal.

This phase comparison can be carried out according to different methods.

According to a first proposal phases between different antenna element are compared by averaging each subcarrier phase difference. Alternatively, selected (reliable) sub-carriers can be phase compared. As a further alternative time domain received data can be correlated and the phase difference can then be calculated by multiplying the correlation result by $2 \cdot \pi fc$, wherein fc is a carrier frequency. fc in principal is different for each subcarrier, however for most of the cases fc can be a representative frequency or center frequency. (The phase difference adjustment unit 11 can compensate for this problems.)

Before averaging, the phase at each subcarrier are frequency adjusted to compensate for the frequency differences of the subcarriers. A base subcarrier can be selected, which can be the center subcarrier or any subcarrier representing an OFDM symbol. All phase differences and amplitude differences are then measured relative to this base subcarrier.

The next time the base is transmitting, the phase of the signal at each antenna element is adjusted such that the terminal 6 receives every signal with the same phase. This corresponds to the adjustment of the transmission timing at each antenna means.

The next time the base 1 receives, the phases of the signals can be adjusted again. If there is a memory provided in the base 1, the phase adjustment in the receiver side can be done in the same OFDM symbol. Then a new phase difference is calculated for a following transmission.

Optionally, the adjustment value can be averaged several times to get a more reliable value. If one (or a plurality) of antenna elements of the base 1 cannot receive the up link signal or not with an amplitude higher than the predetermined threshold (for example due to fading), the concerned antenna elements are not used for the down link transmission.

In addition to the phase comparison an amplitude adjustment at each antenna means responding to the result of the phase comparison is possible. It is to be noted that the above process can be effected on both sides of the wireless transmission links, i.e. both on the base 1 and the terminal 6.

The present invention has the advantage that the terminal (mobile side) does not necessarily have to measure each path from different antennas. Therefore, no orthogonal signaling for each channel is required. As the number of antennas at the base 1 is not limited by the number of orthogonal signals available (as no orthogonal coding is needed), the number of antenna elements at the base 1 can be increased in principle without limits. Therefore, the antennas can be configured to represent adaptive array antennas such that sharper beam is possible. Therefore, the transmitting power on both sides can be reduced and both fading and interference can be reduced.

The invention claimed is:

1. A transmission diversity device, comprising:
   a plurality of antenna elements;
   a plurality of processing devices respectively connected to one of the antenna elements; and
   phase comparison and adjustment means for comparing phases of data signals received at the antenna elements and for adjusting phases of signals transmitted by the antenna elements according to the result of the comparison,
   wherein the transmission diversity device is designed for a multicarrier transmission and individually compares the phase of each data subcarrier of the multicarrier transmission of each antenna element with a phase of a corresponding data subcarrier of at least one other antenna element and adjusts the phase subsequently for a transmission and the data subcarrier has no pilot symbols.

2. The transmission diversity device according to claim 1, wherein the device is designed for an OFDM transmission.

3. The transmission diversity device according to claim 1, further comprising:
   a subcarrier phase comparison dependent amplitude adjustment function.

4. The transmission diversity device according to claim 1, further comprising
   a means for averaging phase differences of a plurality of subcarriers respectively received at one antenna element.

5. The transmission diversity device according to claim 1, further comprising
   a means for frequency adjusting phase differences of the subcarriers received respectively at one antenna element.

6. The transmission diversity device according to claim 1, further comprising
   a means for comparing only predetermined subcarriers of different antenna elements.

7. A method for a wireless transmission diversity transmission by means of a plurality of antenna elements and a plurality of processing devices respectively connected to one of the antenna elements, comprising:
   comparing, individually, a phase of each data subcarrier of a multicarrier transmission for each antenna element of the plurality of antenna elements with a phase of a corresponding data subcarrier of at least one other antenna element of the plurality of antenna elements; and
   adjusting the phase subsequently for a transmission wherein the data subcarrier has no pilot symbols.

8. The method according to claim 7, wherein the step of comparing is repeated at least twice to calculate an average value used for the step of adjusting.

9. The method according to claim 7, wherein the multicarrier transmission is a OFDM transmission.

10. The method according to claim 7, further comprising the step of amplitude adjustment depending on the subcarrier phase comparison.

11. The method according to claim 7, further comprising:
    the step of averaging the phase differences of a plurality of subcarriers respectively received at one antenna element.

12. The method according to claim 7, further comprising
    the step of frequency adjusting phase differences of the data subcarriers received respectively at one antenna element.

13. The method according to claim 7, further comprising:
    the step of comparing only predetermined subcarriers of different antenna elements.

14. The method according to claim 7, wherein the step of comparing comprises
the step of correlating time domain data.

15. The method according to claim 7, wherein in case it is detected that at any of the antenna elements no signal or a signal with an amplitude below a predetermined threshold is received, said antenna element is not used for a transmission.

16. The method according to claim 7, wherein the method is only applied in a base station of a wireless transmission system.

17. A computer readable medium and instructions in the medium to be executable by a computer for a wireless transmission diversity transmission by means of a plurality of antenna elements and a plurality of processing devices respectively connected to one of the antenna elements, said instructions comprising:
    comparing individually a phase of each data subcarrier of a multicarrier transmission for each antenna element with a phase of a corresponding data subcarrier of at least one other antenna element; and
    adjusting the phase subsequently for a transmission wherein the data subcarrier has no pilot symbols.

18. A communication device for transmitting and/or receiving OFDM signals in a multicarrier transmission system, the communication device comprising:
    a plurality of antenna elements for receiving the OFDM signals which are transmitted by using a plurality of data subcarriers used for the transmission of said OFDM signals in the multicarrier transmission system, wherein the data subcarriers have no pilot symbols; and
    a processing device for calculating subcarrier phases of each of said plurality of data subcarriers used for the multicarrier transmission of said OFDM signals and for adjusting each of said data subcarrier phases of said plurality of subcarriers in accordance with said calculated subcarrier phases respectively and adjusts said subcarrier phases so as to reduce a multipath fading in the multicarrier transmission system.

19. A communication device for transmitting and/or receiving OFDM signals to/from another communication device in a multicarrier transmission system, the communication device comprising:
    a plurality of antenna elements for receiving the OFDM signals which are transmitted by using a plurality of data subcarriers being used for the transmission of said OFDM signals in the multicarrier transmission system, wherein the data subcarriers have no pilot symbols; and
    a processing device, connected to said plurality of antenna elements for calculating subcarrier phases of each of said plurality of data subcarriers used for the multicarrier transmission of said OFDM signals, so that subcarrier phases of each of said plurality of data subcarriers to be used in a subsequent communication process between said communication device and another communication device are adjusted in accordance with said calculated subcarrier phases.

20. A communication device for transmitting OFDM signals in a multicarrier transmission system, the communication device comprising:
    a plurality of antenna elements for transmitting the OFDM signals which are to be transmitted by using a plurality of subcarriers of the multicarrier transmission system, wherein said plurality of subcarriers are data subcarriers to transmit data information in the multicarrier transmission system, and the data subcarriers have no pilot symbols;
    processing device, connected to said plurality of antenna elements, for processing said OFDM signals to be transmitted,
    wherein said processing device receives information concerning subcarrier phases of each of said plurality of data subcarriers, and adjusts subcarrier phases of said data subcarriers to transmit said data information in accordance with said information concerning subcarrier phases.

21. A communication device for transmitting OFDM signals to receiver device in a multicarrier transmission system, the communication device comprising:
    a plurality of antenna elements for transmitting the data information as said OFDM signals to be transmitted by using a plurality of data subcarriers of the multicarrier transmission system, wherein the data subcarriers have no pilot symbols; and
    processing device, connected to said plurality of antenna elements, for generating said OFDM signals to be transmitted by said plurality of antenna elements,
    wherein said processing device obtains subcarrier phases of each of said plurality of data subcarriers based on the communication made between said communication device and receiver device in the multicarrier transmission system, and adjusts subcarrier phases of said data subcarriers to generate said OFDM signal in accordance with said subcarrier phases.

22. A communication device for transmitting and/or receiving OFDM signals in a multicarrier transmission system, the communication device comprising:
    a plurality of antenna elements for receiving the OFDM signals each of which is transmitted by using a plurality of subcarriers in the multicarrier transmission system; wherein said plurality of subcarriers are data subcarriers for transmitting data signals and said data subcarriers have no pilot symbols; and
    processing device for calculating subcarrier phases of all of said data subcarriers of said OFDM signals and adjusts said subcarrier phases in accordance with said calculated subcarrier phases.

23. A communication device for transmitting and/or receiving OFDM signals in a multicarrier transmission system, the device comprising:
    a plurality of antenna elements for receiving the OFDM signals each of which is transmitted by using a plurality of subcarriers of the multicarrier transmission system, wherein said plurality of subcarriers are data subcarriers for transmitting data signals and said data subcarriers have no pilot symbols; and
    processing device, connected to said plurality of antenna elements, for processing said received OFDM signals,
    wherein said processing device calculates symbol vectors indicating subcarrier phases of said plurality of subcarriers of each of said received OFDM signals so that subcarrier phases of each of said plurality of subcarriers to be used in a subsequent communication process in the multicarrier transmission system are adjusted in accordance with said calculated symbol vectors.

24. A communication device for communicating data signals with another communication device in an OFDM multicarrier transmission system, the device comprising:
    a plurality of antenna elements for receiving said data signals which are transmitted by using a plurality of subcarriers being used in said OFDM multicarrier transmission system wherein said plurality of subcarriers are data subcarriers for transmitting data signals and said data subcarriers have no pilot symbols, and processing device, connected to said plurality of antenna elements, for calculating subcarrier phases of said plurality of subcarriers, wherein said processing device, when said communication device send data signals to said another communication device by using said plurality of subcarriers, adjusts said subcarrier phases of said plurality of subcarriers in accordance with said calculated subcarrier phases.

25. A communication device for enabling data communication with another communication device in an OFDM multicarrier transmission system, the device comprising:

a plurality of antenna elements for receiving data signals which are transmitted by using a plurality of subcarriers being used in said OFDM multicarrier transmission system, wherein said plurality of subcarriers are data subcarriers for transmitting data signals and said data subcarriers have no pilot symbols, calculator for calculating subcarrier phases of said plurality of subcarriers, and transmitter, being designed to receive said calculated subcarrier phases, for performing a transmission process to transmit data signals from said communication device to said another communication device, wherein said transmitter adjusts subcarrier phases of said plurality of subcarriers used in said transmission process on the bases of said calculated subcarrier phases.

26. A communication device for transmitting and/or receiving OFDM signals in a multicarrier transmission system, the communication device comprising:

a plurality of antenna elements for receiving the OFDM signals transmitted by using a plurality of subcarriers being used for the transmission of said OFDM signals in the multicarrier transmission system, wherein said plurality of subcarriers are data subcarriers for transmitting data signals and said data subcarriers have no pilot symbols; and processing device, connected to said plurality of antenna elements, for calculating subcarrier phases of said plurality of subcarriers used for the multicarrier transmission of said OFDM signals and for adjusting said subcarrier phases of said plurality of subcarriers to be used for subsequent multicarrier transmission in the multicarrier transmission system in accordance with said calculated subcarrier phases.

27. A communication device for transmitting and/or receiving OFDM signals to/from another communication device in a multicarrier transmission system, the communication device comprising:

a plurality of antenna elements for receiving the OFDM signals which are transmitted by using a plurality of subcarriers being used for the transmission of said OFDM signals in the multicarrier transmission system, wherein said plurality of subcarriers are data subcarriers for transmitting data signals and said data subcarriers have no pilot symbols; and processing device, connected to said plurality of antenna elements, for calculating subcarrier phases of said plurality of subcarriers used in the multicarrier transmission of said OFDM signals, and for adjusting subcarrier phases of said plurality of subcarriers, to be used in a subsequent communication for sending data information from said communication device to another communication device, in accordance with said calculated subcarrier phases.

* * * * *